United States Patent [19]
Behrens et al.

[11] 4,379,219
[45] Apr. 5, 1983

[54] SHAVING UNIT AND METHOD OF MANUFACTURE THEREFOR

[75] Inventors: Henry Behrens, Topsfield; Chester F. Jacobson, Southboro, both of Mass.

[73] Assignee: The Gillette Company, Boston, Mass.

[21] Appl. No.: 335,320

[22] Filed: Dec. 29, 1981

Related U.S. Application Data

[63] Continuation of Ser. No. 142,324, Apr. 21, 1980, abandoned.

[51] Int. Cl.³ .............................................. B23K 27/00
[52] U.S. Cl. ........................ 219/121 LC; 219/121 LP
[58] Field of Search ................ 219/121 LC, 121 LD, 219/121 EC, 121 ED, 121 LP, 121 L, 121 LM, 219/121 EB, 121 EM, 121 ER

[56] References Cited
U.S. PATENT DOCUMENTS

| | | | |
|---|---|---|---|
| 3,315,548 | 4/1967 | Anderson et al. | 228/242 X |
| 3,965,327 | 6/1976 | Ehlscheid et al. | 219/121 LP X |
| 4,000,392 | 12/1976 | Banas et al. | 219/121 LC |

*Primary Examiner*—C. L. Albritton
*Attorney, Agent, or Firm*—Leonard J. Janowski

[57] ABSTRACT

Shaving units as well as methods and apparatus for producing such units by using laser energy to weld a narrow elongated razor blade strip to a support member. In one form of the invention, a perforated welding mask made from a metal having high reflectance to the laser energy is employed to define the spacing of the welds joining the two members.

16 Claims, 5 Drawing Figures

SHAVING UNIT AND METHOD OF MANUFACTURE THEREFOR

This application is a continuation of application Ser. No. 142,324, filed Apr. 21, 1980, abandoned.

BACKGROUND OF THE INVENTION

Traditional safety razor blades have a substantial width perpendicular to the cutting edge and are held in position in the razor by clamping between members which engage opposite surfaces of the blade itself. It has been proposed to replace such blades by very narrow blade strips, which as well as being economical of material, are easily rinsed clean after use and can be so mounted as to have a desirably greater degree of flexibility than conventional blades. To give the narrow blade strips adequate rigidity, it has been proposed to hold them under longitudinal tension and/or to impart a special cross-sectional shape to the blade strip.

It has also been proposed to provide a shaving unit comprising a narrow elongated blade strip sharpened along one longitudinal edge and an elongated support member which is of greater length than the blade strip, and which is formed over a length at least equal to the active shaving length of the blade strip with a substantially flat surface, one face of the blade strip being secured along its length to the surface of the support member with the cutting edge of the blade projecting clear of the support member. Shaving units of this type are disclosed in U.S. Pat. Nos. 4,063,357 and 4,084,316. In the production of such shaving units, the blade strips are positioned with respect to the support member and secured by the use of conventional welding techniques.

Existing welding techniques include gas welding which employs a burning gas such as acetylene or hydrogen, arc welding in which the fusion energy is obtained from an electric arc, resistance welding in which current is passed through the workpiece placed between the ends of two electrodes, ultrasonic welding where the parts to be welded are clamped between anvils through which high frequency mechanical vibration is coupled to the workpiece to effect solid state bonding of the adjoining surfaces, electron beam welding in which a focused beam of electrons supplies the fusion energy to the workpiece which is held in a vacuum environment, and laser welding in which the fusion energy is supplied by a focused beam of infra-red radiation. An optimum welding technique would include the desirable features from all methods; that is, precise control of position and size of weld area, precise control of energy input, high welding speed capability, minimum heat affected zone, minimum disruption of metallurgical structure, a clean process free of oxidation reactions, a non-contact operation, and easy application in an automatic manufacturing process. Of the welding processes listed, laser welding combines a unique combination of advantages that make it of distinct interest in specialized welding applications. These advantages include: (1) The laser beam can be optically focused to provide precise position and size control of the weld area; (2) power density of the focused spot can be adjusted and precisely controlled from low to very high values; (3) very high weld speeds are possible by means of high power densities and/or pulsed laser operation; (4) with high welding speeds the resulting heat affected zone is very small and disruption of the metallurgical structure at a distance from the fusion zone is minimized; (5) the process is very clean and oxidation reactions can be prevented easily by use of an inert cover gas; (6) welding is performed in the open unlike electron beam welding whereby the operation is typically performed in a vacuum; (7) the process is of the non-contact type; and (8) laser welding can be readily integrated into a high speed automatic assembly process.

SUMMARY OF THE INVENTION

The present invention is concerned with methods and apparatus for using as well as shaving units made by using laser energy to weld a narrow elongated razor blade strip to a support member with the cutting edge of the blade strip projecting clear of the support member to form a shaving unit. A tensioned blade strip is positioned with respect to a supporting member and welded to it by the action of a laser beam. In one form of the invention, a perforated welding mask made from a metal having high reflectance to the laser energy is employed to define the spacing of the welds joining the two members. In a preferred form of the invention, a flow or blanket of inert gas across the welding area is employed to prevent unwanted oxidation of the welds and heat affected zones.

BRIEF DESCRIPTION OF THE DRAWINGS

The above and other objects and features of the present invention may be more fully understood from the following detailed description, taken in conjunction with the accompanying drawings of a simple fixture designed for single unit hand assembly in which.

DETAILED DESCRIPTION OF THE INVENTION

Figure 1:
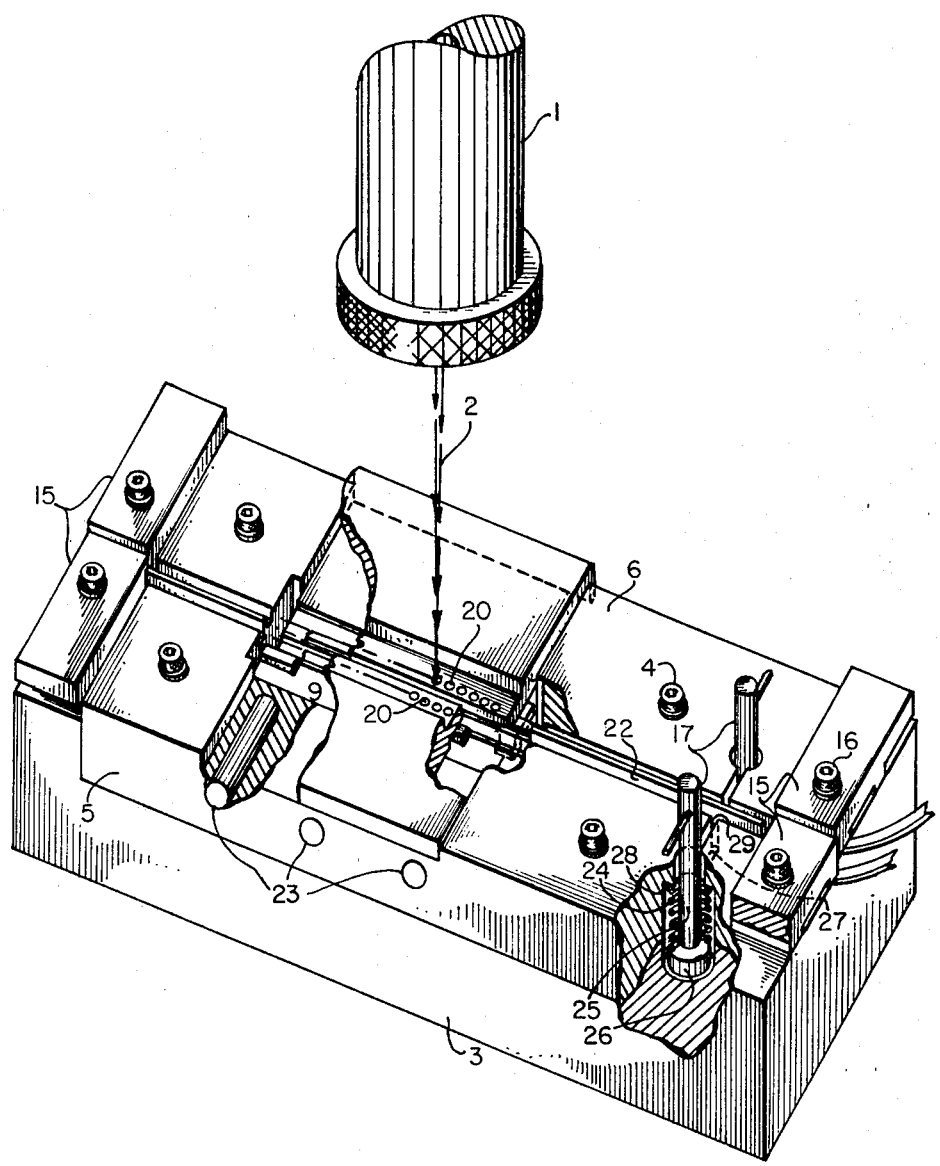
FIG. 1 is a perspective view of a welding fixture used in the laser welding of razor blade strips to support members.

With reference to the drawings, there is shown in FIG. 1 a perspective view of a laser welding system wherein a laser energy source 1 is employed to generate and direct a focused beam 2 of infra-red radiation toward a fixture base 3 upon which is mounted the members to be welded. The laser energy source 1 may be a continuous wave or pulsed power laser of a well known type such as, carbon dioxide with an output radiation wavelength of 10.6 microns, neodimium yittrium aluminum garnet (Nd:YAG) at 1.06 microns, neodimium glass at 1.06 microns, or ruby at 0.694 microns. The increased melting efficiency of pulsed mode operation enhances the use of higher welding rates or greater melt zone penetration for welding thicker materials. Details of the laser energy source 1 are well known and will accordingly not be described herein.

The particular apparatus depicted in FIGS. 1 through 4 is designed to position two separate blade members with respect to a single blade support member to form a shaving unit having both primary and secondary cutting edges. The method of this invention, however, may be employed equally usefully in joining a single cutting member to a support to form a conventional single edged shaving unit, or three or more cutting members to form a multiple edged shaving unit.

Figure 2:
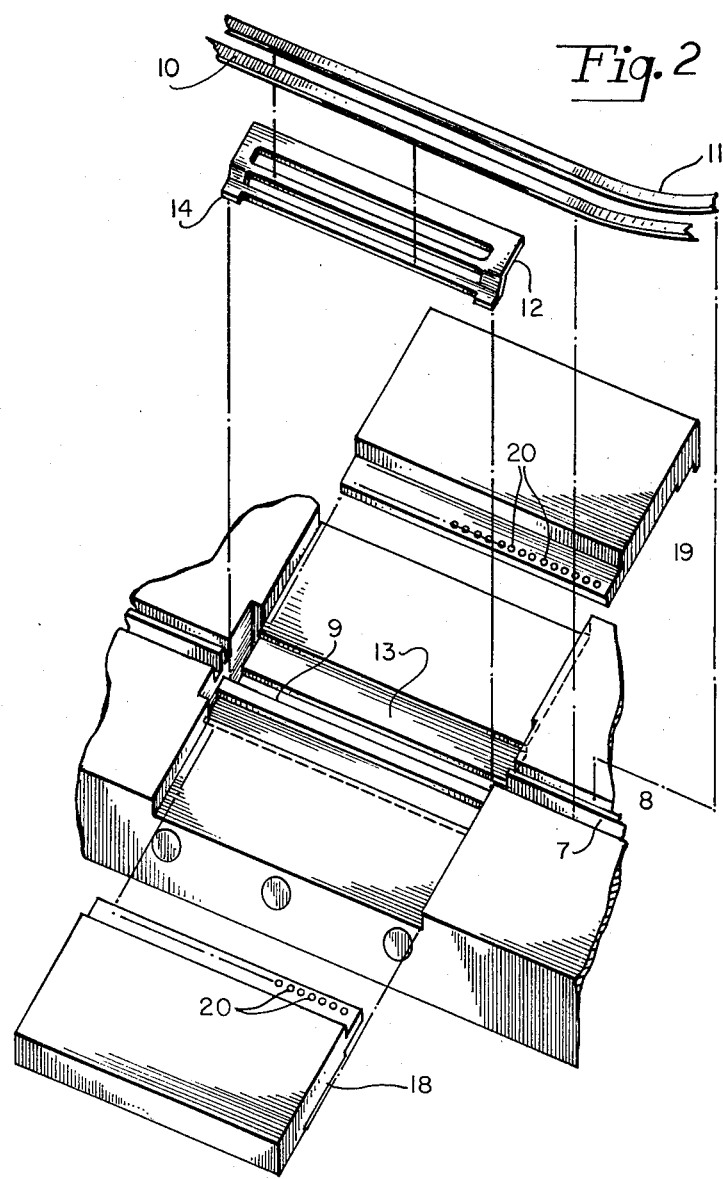
FIG. 2 is an exploded larger scale view of a portion of the fixture, shown in FIG. 1.

The apparatus depicted in particular in FIGS. 1 and 2 comprises a fixture base 3 upon which is mounted, through the agency of screws 4, a primary blade reference block 5 and a secondary blade reference block 6. Formed by the juxtaposition of blade reference blocks 5 and 6 are a primary blade locating slot 7 and a secondary blade locating slot 8, said blade locating slots being separated by a blade separating rib 22. For more critical positioning of the blade edge, spring loaded pushers (not shown) may be added to urge the blade strips forward against reference stops. Formed integrally with primary blade reference block 5 is blade support locating rib 9.

In operation, a primary blade member 10 and a secondary blade member 11, each in the form of a stainless steel strip having a width of about 0.04 inch and being sharpened to a cutting edge over its entire length are positioned upon a blade support member 12 after the blade support member has been located in a blade support nest 13 with end protrusions 14 abutting the blade support locating rib 9. Alnico bar magnets 23 are located within holes drilled in primary blade reference block 5 as shown for the purpose of assuring the location of protrusions 14 against blade support locating rib 9. Reference block 5 is made from a non-magnetic material such as austenitic stainless steel, brass, or aluminum. In a production embodiment, wear resistant materials would be provided at points of wear such as locating rib 9, blade reference blocks 5 and 6, and other critical points of wear.

To provide tension in blade members 10 and 11 for the purpose of removing any lateral curvature or lack of straightness and maintaining them in alignment with blade support member 12, strip end clamps 15 are first tightened through the agency of screws 16. A pin 27, which rides on the upper surface of primary blade member 10 and in like case on secondary blade 11, as shown in FIG. 1, is urged downwardly by virtue of the action of a spring 24 which bears against a counterbore shoulder 28 and a foot 26, thereby exerting a downward, tensioning force individually on blade member strips 10 and 11. To release the tension on either blade member, a tensioning member 17 is lifted until pin 27 is clear of a slot 29 after which a shaft 25 is rotated until pin 27 bears against an upper surface of the primary blade reference block 5.

Figure 3:
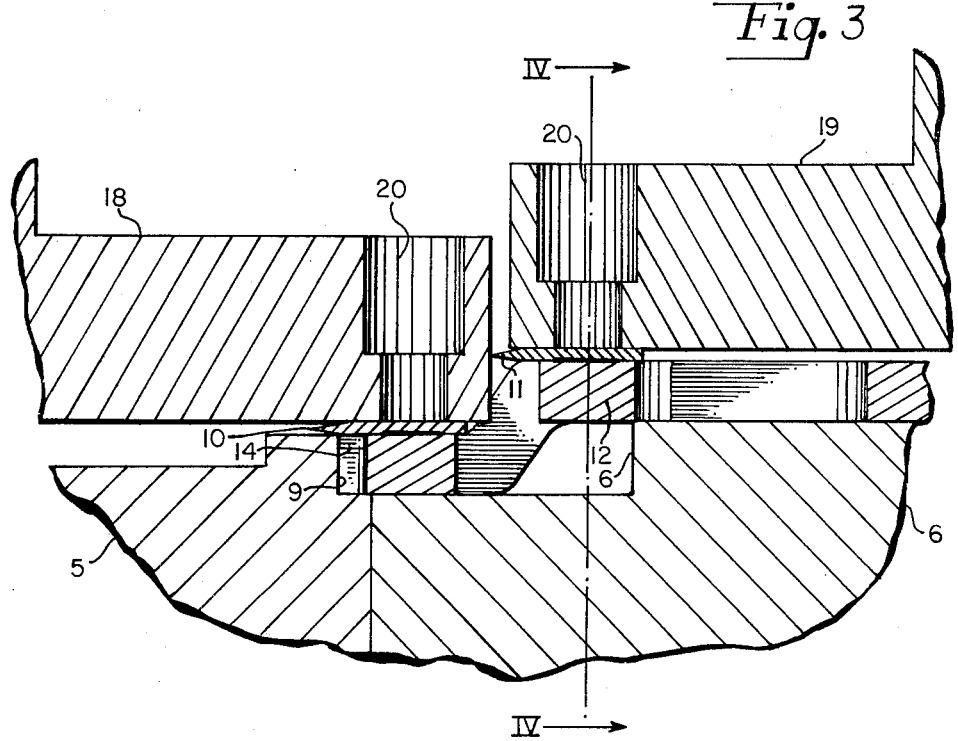
FIG. 3 is an expanded partial cross-sectional view showing the relative positioning of two blade members and their support with respect to the welding fixture and masks.
Figure 4:
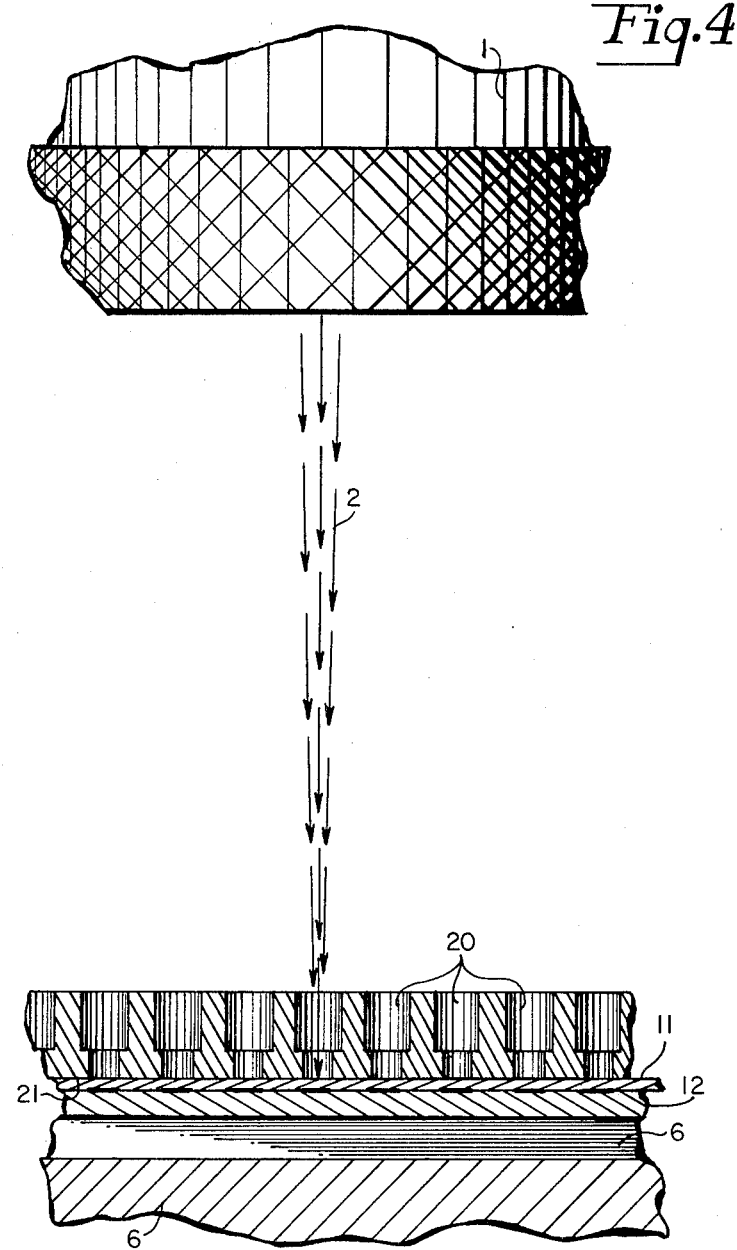
FIG. 4 is an isolated cross-sectional view showing the operation of a welding mask having counterbored apertures.

A primary blade welding mask 18 and a secondary blade welding mask 19 are then positioned with respect to blade members 10 and 11 so that counterbored holes 20 are centered over the portion of the blade members to be exposed to laser welding energy. The masks may be secured in position using screws or clamps (not shown). The blade welding masks function as clamps and as heat sinks to (a) insure intimate contact between the blade member and the blade support member during welding, (b) prevent heat distortion, and (c) limit conduction of heat that may temper the blade edge. To this end, it is important to maximize contact area of the masks by minimizing the diameter of holes 20 in the portion of the welding masks nearest to surface 21 which is in contact with the surface of the blade members. To reduce clipping of the focused laser beam as it enters and leaves each hole, the holes 20 are counterbored (or otherwise relieved) as shown in FIGS. 3 and 4.

Blade welding masks 18 and 19 may be made from any metal which is highly reflective to the specific radiation wavelength of the laser used to insure that it does not itself become melted during the welding process. Two excellent materials, highly reflective to the range of wavelengths of interest, are copper and gold. To achieve adequate wear resistance of masks that utilize soft materials such as copper or gold, the wear surfaces of the masks may be surfaced with hard materials or the masks may be made of these hard materials, such as cemented carbides, hardened steel, or ceramics and then plated or otherwise clad with the high reflectivity materials of choice on the surfaces that see radiation.

Figure 5:
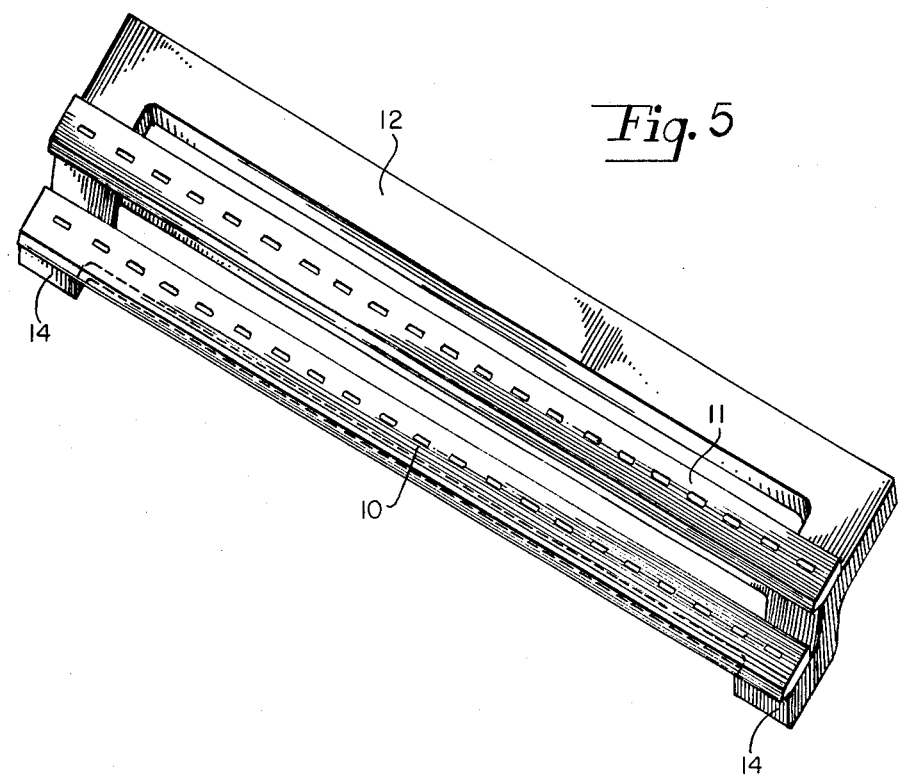
FIG. 5 is a perspective view of a shaving unit of this invention showing the interrupted weld used in the practice of the invention.

In another embodiment, the holes 20 in the masks may be replaced with a continuous narrow slot and the interrupted (stitch) weld can be effected by repetitively gating on and off action of the laser beam as it traverses the length of the slot. A typical weld pattern produced by the use of either a perforated welding mask or by repetitively gating the laser beam is shown in FIG. 5.

Once the blade welding masks have been properly positioned with respect to the blades and blade support members, the masks are clamped in place by agency of screws (not shown) so that surfaces 21 bear directly on the blades in turn holding the blades in intimate contact with the blade support member. The blade members are welded to the blade support by moving either the fixture assembly 3 or laser beam source 1 in a manner such that the focused beam 2 impinges upon the upper surfaces of the primary and secondary blade members 10 and 11 as it traverses holes 20 in blade welding masks 18 and 19. By virtue of the interruptions in the reflective blade welding mask, a discontinuous weld is produced which secures the blade members to the support member without any of the disadvantages inherent in the use of other welding methods. After welding, the ends of blade members 10 and 11 are cut to the same length as blade support member 12 by mechanical shearing or laser cutoff, for example.

To prevent oxidation of the welds and heat affected zones during welding, it is important to use an inert gas cover which is essentially non-reactive with the material being welded.

While the embodiment of the invention described above illustrates apparatus for use in a unit process for welding a primary and a secondary blade member to a single blade support to form a shaving unit, the method of the invention is equally applicable to continuous production processes.

In the application of this invention to a production process, the basic functions of the fixturization and methods of operation previously described are preserved. However, the equipment design is appropriately modified so that the actions of parts feeding, orienting, clamping, masking, and welding are automatically performed. For example, in a typical embodiment, a multiplicity of duplicate fixtures can be mounted on an indexing machine wherein as each fixture passes through successive stations, the operations of loading of blade support, feeding, positioning, and clamping of blade strips, positioning of masks, laser welding, trimming of blade strip ends, and unloading of the completed weldment are performed.

We claim:

1. A method for welding a steel blade strip having cutting edge means thereon to a metallic support member, said method comprising holding said strip in tension while positioning it and said member with respect to each other, positioning a welding mask so as to insure intimate contact between the strip and support member and subjecting the combination to a laser beam so that energy passes through the mask to weld the strip and support member together.

2. A method as described in claim 1 in which the welding mask is perforated.

3. A method as described in claim 1 in which the welding mask has a continuous narrow slot and in which an interrupted weld is effected by repetitively gating on and off the action of the laser beam as it traverses the length of the slot.

4. A method as described in claim 2 in which the perforations in the welding mask are relieved to reduce clipping of the laser beam as it enters and leaves each perforation.

5. A method as described in claim 1 in which the welding mask has a surface which is highly reflective to the specific radiation wavelength of the laser beam to insure that it does not itself become melted during the welding process.

6. A method as described in claim 1 in which the welding mask is made of a material selected from the class consisting of cemented carbides, hardened steel, and ceramics and has a surface clad with a metal which is highly reflective to the specific radiation wavelength of the laser beam.

7. A method as described in claim 1 in which the welding mask is made of a metal which is highly reflective to the specific radiation wavelength of the laser used and in which a wear surface is made from a material selected from the class consisting of cemented carbides, hardened steel, and ceramics.

8. Apparatus for using laser energy to weld a steel blade strip having cutting edge means thereon to a metallic support member comprising a fixture base, means mounted thereon for positioning said metal strip and said support member with respect to each other, means for providing tension in said metal strip, and a welding mask adapted to insure intimate contact between said metal strip and said support member during welding.

9. Apparatus as described in claim 8 in which the welding mask is perforated.

10. Apparatus as described in claim 9 in which the perforations are in the form of holes which are relieved to reduce clipping of the laser beam.

11. Apparatus as described in claim 8 in which the welding mask has a narrow slot.

12. Apparatus as described in claim 8 in which the welding mask is made of a material selected from the class consisting of cemented carbides, hardened steel, and ceramics and has a surface clad with a metal which is highly reflective to the specific radiation wavelength of the laser energy.

13. Apparatus as described in claim 8 in which the welding mask is made of a metal which is highly reflective to the specific radiation wavelength of the laser used and in which a wear surface is made from a material selected from the class consisting of cemented carbides, hardened steel, and ceramics.

14. A shaving unit comprising a support member, a blade member having a cutting edge thereon, and a series of welds disposed substantially throughout the length of said blade member and fixedly interconnecting said blade member and said support member, said blade member being under tension lengthwise thereof.

15. A shaving unit as described to claim 14 in which said support member and said blade member are fixedly interconnected by a series of laser welds.

16. A shaving unit as described in claims 14 or 15 in which said blade member comprises a stainless steel strip.

* * * * *